United States Patent Office 3,276,266
Patented Oct. 4, 1966

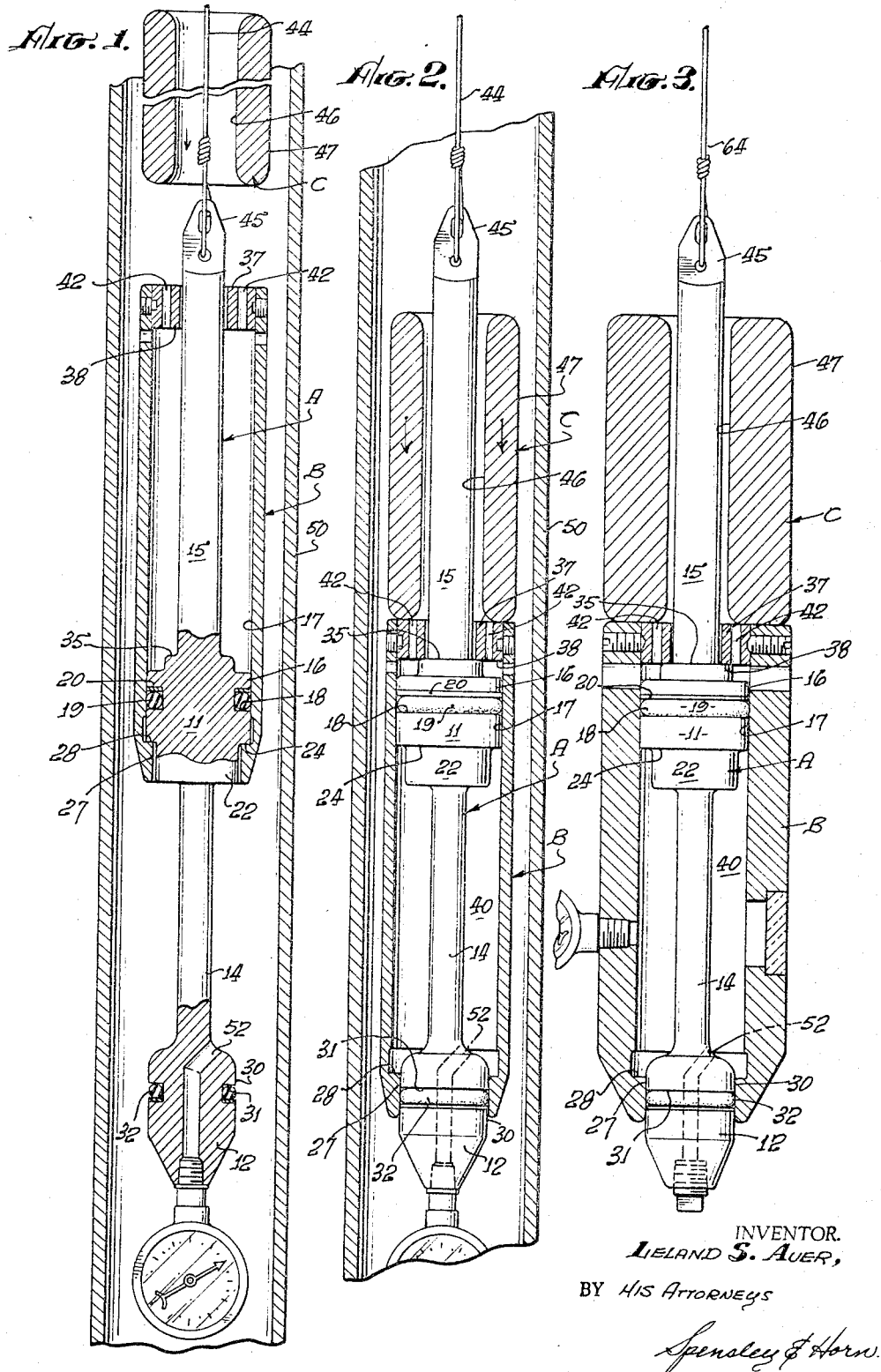

3,276,266
FLUID SAMPLING APPARATUS
Leland S. Auer, Sherman Oaks, Calif., assignor to Grant Oil Tool Company, Los Angeles, Calif., a corporation of California
Filed Apr. 27, 1964, Ser. No. 362,685
1 Claim. (Cl. 73—425.4)

This invention relates to an apparatus for sampling materials under pressure and more particularly to an apparatus for obtaining samples of flowable materials, such as liquids, gas, sands, debris, and the like from environments in which such materials are under pressure.

In various instances it is necessary to sample a material or product which is under high pressure and to obtain the sample of such product in the environment creating such pressures. For example, it is often necessary to obtain a sample of fluids at the bottom of a fluid column existing in a well or the like. When such samples are required it is necessary to obtain the sample without contamination thereof by materials existing in the fluid column at any point other than that from which the sample is to be taken. Another example of the necessity of obtaining a sample of a material under pressure is that of obtaining a sample of sea water and its contained marine life and contaminants at a predetermined depth. That is for various scientific studies it is often necessary to obtain a sample of sea water at great depth in the ocean in order to analyze and study the characteristics and materials contained in the sea water at that depth. Since extreme pressures may be encountered at great ocean depths it is necessary to obtain a sample of the water at the in situ pressures and temperatures and to retain the sample in its environmental conditions when the sample is removed from that depth to the decreasing pressures encountered as it is brought to the surface.

It is an object of the present invention to provide an apparatus for obtaining samples of materials at the environmental conditions at which they exist.

It is another object of the present invention to provide an apparatus for obtaining samples of materials in situ and to retain the sample at the pressure existing in the environment from which it was taken.

Another object of the present invention is to provide an apparatus for obtaining a sample of material at that pressure and in an uncontaminated state when removed from the environment.

Yet another object of the present invention is to provide an apparatus for obtaining samples of fluids, sands and other flowable materials, debris and the like from remote locations such as exist in a well or at a predetermined depth in a body of water.

A further object of the present invention is to provide such an apparatus for sampling materials which is simple and efficient in operation and which is economical of manufacture.

The present invention comprises in general a product sampler which includes a body portion and a sleeve portion surrounding the body which sleeve portion can be moved into engagement with the body at a remote location such that a volume of material surrounding the body at the location is entrapped between the body and the sleeve. Means are provided for causing the cavity to close and retain at the pressure at which it was closed from a remote location.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:
FIGURE 1 is a cross-sectional view of an apparatus in accordance with the present invention as used to obtain a sample of fluid in a well, the apparatus being shown in the opened position;
FIGURE 2 is a view similar to FIGURE 1 with the apparatus in the closed condition; and
FIGURE 3 is a cross-sectional view of an alternative embodiment of the present invention as employed for sampling deep water products.

Although not limited thereto the present invention is particularly adapted for obtaining samples of fluids existing under a large column of fluid or at great depth in a body of water and the invention will accordingly be described in connection with such uses.

Referring now to the drawing in FIGURES 1 and 2 an embodiment of the apparatus as adapted for obtaining samples of fluids at predetermined depths in a well is shown. The apparatus includes in general terms a body portion A, a body sleeve B and a tripping sleeve C. The body A includes first and second spaced apart pistons denoted as the upper piston 11 and the lower piston 12. The pistons are interconnected by a spacer rod 14 which can be integrally formed with the pistons. Extending upwardly from the upper piston 11 in the orientation of figures is a connecting rod 15 which can also be integral with the upper piston 11. All of the connecting rod, the upper piston, the spacer rod and the lower piston are symmetrically oriented with respect to a longitudinal center line therethrough. The body sleeve B is slidably mateable with the upper and lower pistons as described more fully hereinafter. The upper piston has a cylindrical portion defined by the peripheral wall 16 which has a diameter substantially equal to the inside diameter of the inner wall 17 of the body sleeve. An O groove 18 is defined in the peripheral wall 16 of the upper cylinder 11 and an O ring 19 is positioned therein in the manner well known to the art to provide a sealing contact with the cylindrical wall 17 of the body sleeve. Due to the high pressure forces involved a backup ring 20 is positioned above the O ring 19 to prevent deformation beyond the ceiling limits of the O ring. The connecting rod 15 is then affixed and extends upwardly from the upper piston 11 and is of a length which is greater than the length of the body sleeve B when the body sleeve is in the position shown in FIGURE 1 which is the fully opened position of the apparatus.

Beneath the peripheral wall 16 of the upper piston 11 is a longitudinal portion of decreased diameter defined by the peripheral wall 22. The spacer rod 14 is then affixed to the upper piston at the lower surface thereof. The difference in diameter between the peripheral wall 16 and the peripheral wall 22 of lesser diameter defines a shoulder 24 which as a transverse surface acts as a stop surface to define the limits of upward travel of the body sleeve B. Thus at the lower end of the body sleeve B there is provided a portion of lesser diameter than the cylinder diameter defined by the wall 17 of the body sleeve. The lesser diameter portion is defined by the wall 27 and is substantially equal to but of greater diameter than the diameter of the peripheral wall 22 of the upper piston 11. The longitudinal extent of the wall 27 is approximately equal to the longitudinal extent of the reduced diameter portion of the upper piston 11. The region of decreased diameter defined by the wall 27 and the normal cylindrical diameter defined by the wall 17 defines an upwardly facing shoulder 28 which is engageable with the shoulder 24 of the upper piston 11. Thus as shown in FIGURE 1 the extent of travel of the body sleeve B upward with respect to the body A is limited by the engagement of the body sleeve shoulder 28 with the shoulder 24 of the upper piston. The apparatus is shown in this position in FIGURE 1 which is the fully opened position of the apparatus. The lower piston 12 has an outside diameter defined by the peripheral wall 30 which is equal in diameter to the inside diameter of the peripheral portion 27 of the body sleeve B. An O ring groove 31 with an O ring 32 and backup ring 33 are provided in the peripheral wall of the lower piston 12 similar to that described in connection with the upper piston 11. The distance between the O rings 19 and 32 is in effect the upper and lower boundaries of the sealed volume provided by the apparatus in the closed position. The spacer rod 14 has a diameter substantially less than the diameter of the peripheral wall 30 and the peripheral wall 22 which are equal in diameter. The annular space between the upper and lower pistons surrounding the spacer rod 14 and the cylindrical portion 22 is the cavity in which the material to be sampled is trapped.

At the upper surface of the upper piston a transfer shoulder 35 is provided to define the stop surface for the limit of downward travel of the body sleeve B. A stop ring 37 is affixed at the upper end of the body sleeve and surrounds the connecting rod 15. The stop ring is affixed to the wall of the body sleeve and defines a lower surface 38 which is the stop surface that is movable into engagement with the stop surface 35 of the upper piston. Thus the limits of travel of the body sleeve relative to the body are defined by the point at which the bearing shoulder 28 of the body sleeve comes into engagement with upper piston 11 as the upper limit of travel to the body sleeve and the position at which the stop surface 38 of the stop ring comes into contact with the stop surface 35 at the upper surface of the upper piston 11 as shown in FIGURE 2. From the foregoing it is apparent that the length of the body sleeve between the shoulders 24 and the stop surface 38 is interdependent with the length of the body between the O ring 32 and the stop surface 35. That is the length of the body sleeve is such that in the closed position of the apparatus as shown in FIGURE 2 the peripheral wall 27 of the body sleeve is in sealing engagement with the O ring 32 peripheral wall of the lower piston 12 when the stop surface 38 of the stop ring is in bearing contact with the stop surface 35 on the upper piston 11. When in this position the annular cavity 40 between the body sleeve and the body is enclosed and sealed by the sealing contact of the O ring 19 with the cylinder wall 17 and the O ring 32 with the cylinder wall 27. The length of the connecting rod 15 is such that it extends above the stop ring 37 when the body B is in the upper position as shown in FIGURE 1.

A plurality of exhaust openings 42 are defined through the stop ring 37 to permit the exhaustion of materials from the body sleeve as it is moved from the opened to the closed position of the apparatus.

At the upper end of the connecting rod 15 a bail top connection is provided and a wire line is affixed thereto. The wire line is shown as 44 in the drawing and is used to lower the apparatus to the depth at which it is desired to take a sample of the material. The bail top is provided with a tapered end 45 to allow the tripping sleeve to easily pass the end as described more fully hereinafter. The tripping sleeve 45 is a cylinder of heavy material such as steel and is a tubular member having a substantial wall thickness to obtain the weight necessary for the operation of the device. The inside diameter defined by the wall 46 is substantially greater than the diameter of the connecting rod 15 while the outside diameter defined by the wall 47 is approximately equal to but less than the outer diameter of the body sleeve B. In operation the apparatus of the present invention is utilized to obtain a sample of material in a well at any predetermined depth by lowering the apparatus in the open position, that is with the body sleeve in the upward position as shown in FIGURE 1, into the well to the predetermined depth by means of the wire line 44. The apparatus slides down the well as defined by the well casing 50. When the apparatus has reached the required depth and it is desired to take the sample the tripping sleeve 45 is lowered by dropping down the wire line 44. In the open position the body sleeve B is maintained in the upward position by the frictional engagement of the O ring 19 with the cylinder wall 17. As the tripping sleeve 45 strikes the body sleeve and comes to rest on the upper surface of the stop ring 37 it forces the body sleeve downward due to its inertia and weight until the body sleeve reaches the lower limit of its travel relative to the body at which the stop surface 38 of the stop ring 37 comes to rest against the stop surface of the upper piston 11. During the movement of the body sleeve downward along the pistons the material entrapped in the body sleeve is forced outward through the exhaust openings 42. At the closed position the material surrounding the spacer rod 14 between the upper and lower pistons is entrapped in that position by the downward movement of the body sleeve and the material is sealed in the annular cavity 40 between the O rings 19 and 32. The body sleeve B will remain in the closed position upon the body during removal of the apparatus from the well. It can be seen that as the exterior pressure around the apparatus is lowered by raising it from the well or from a body fluid the pressure within the cavity remains constant and the material therein is uncontaminated by the entry of any additional material once the apparatus has been moved to the closed position.

An exhaust port 52 is defined through the lower piston 12 from a surface at which it is in communication with the annular cavity 40 to a surface at which it is in communication with the exterior of the apparatus. In the embodiment shown the port extends from the upper surface of the lower piston at a position adjacent the spacer rod 14 to the lower end of the piston which is located exteriorly of the body sleeve B. Into this port a clog may be inserted as shown in FIGURE 3 or a pressure gauge or valve or suitable instrumentation can also be affixed at this port. For example the pressure gauge is shown in FIGURES 1 and 2. The pressure gauge will indicate the pressure of the material entrapped in the annular cavity 40. A valve can also be affixed at this port to release the pressure within the cavity when it is desired to open the apparatus.

In FIGURE 3 an alternative embodiment of the present invention is shown. This embodiment is similar to the embodiment of FIGURES 1 and 2 previously described except that it is especially suited for high pressure studies of fluids at great depth in the ocean. In this embodiment therefore the walls of the body sleeve B are made substantially heavier than those shown in FIGURES 1 and 2. The embodiment of FIGURE 3 is in all other respects similar to that of the embodiment of FIGURES 1 and 2 except that the walls of the tripping sleeve are correspondingly heavier and a viewing window is positioned through the wall of the body sleeve B so that a visual study of the materials entrapped in the annular cavity can be made. Also a check valve is positioned through the wall of the body sleeve B so that the annular space enclosed by the body sleeve can be purged under pressure.

A two piece tripping sleeve is another convenient construction feature which may be embodied, that is the tripping sleeve may be constructed in two longitudinal sections which hold together thus enabling the tripping sleeve to be removed or installed without requiring the removal of line 44 from the bail top 45.

I claim:

A fluid sampling apparatus comprising:
first and second spaced apart pistons having a spacer rod therebetween, said first piston having a connecting rod extending upwardly therefrom, said pistons and said sleeve and said spacer and connecting rods having a common longitudinal axis therethrough;

said sleeve having a first portion of substantially constant inside dimensions and a second portion of reduced inside dimensions proximate one end of said sleeve, said sleeve having inside extending shoulders proximate each end thereof;

sealing means providing sealing engagement of said reduced dimension second portion of said sleeve with said second piston and providing sealing engagement of said first portion of said sleeve with said first piston, said sealing means providing sealing contacts defining a cavity between said pistons and said sleeve, said second piston extending outwardly from said sleeve in said first position, said sleeve extending in length beyond the distance between said sealing contacts;

said inside extending shoulders of said sleeve providing stop means defining said first and second positions of said sleeve;

remote actuating means for moving said sleeve from said first position to said second position; and cable fastening means proximate the upper end of said connecting rod whereby said sampling apparatus can be lowered to entrap a fluid sample in the in situ condition of said sample.

References Cited by the Examiner
UNITED STATES PATENTS

| | | | |
|---|---|---|---|
| 1,887,859 | 11/1932 | Pearce | 73—425.4 |
| 3,095,930 | 7/1963 | Kisling | 73—425.4 |

LOUIS R. PRINCE, *Primary Examiner.*

S. C. SWISHER, *Assistant Examiner.*